(12) United States Patent
Phillips

(10) Patent No.: US 8,720,117 B2
(45) Date of Patent: May 13, 2014

(54) EXPLOSIVE BREACH TRAINING SYSTEM

(76) Inventor: Darron Phillips, San Antonio, TX (US)

( * ) Notice: Subject to any disclaimer, the term of this patent is extended or adjusted under 35 U.S.C. 154(b) by 0 days.

(21) Appl. No.: 13/420,989

(22) Filed: Mar. 15, 2012

(65) Prior Publication Data

US 2012/0255233 A1  Oct. 11, 2012

Related U.S. Application Data

(60) Provisional application No. 61/452,824, filed on Mar. 15, 2011.

(51) Int. Cl.
*E06B 5/00* (2006.01)
*G09B 19/00* (2006.01)

(52) U.S. Cl.
USPC ............................................ 49/501; 434/226

(58) Field of Classification Search
USPC ................. 49/501, 463, 464, 34, 60; 434/226
See application file for complete search history.

(56) References Cited

U.S. PATENT DOCUMENTS

| | | | | |
|---|---|---|---|---|
| 5,906,493 | A * | 5/1999 | Bishop | 434/226 |
| 6,877,988 | B2 * | 4/2005 | Phillips et al. | 434/226 |
| 7,611,356 | B1 * | 11/2009 | Bishop | 434/226 |
| 7,789,666 | B2 * | 9/2010 | Sovine et al. | 434/226 |
| 7,972,139 | B2 * | 7/2011 | Staub | 434/226 |
| 8,128,408 | B2 * | 3/2012 | Phillips et al. | 434/226 |
| 8,167,621 | B2 * | 5/2012 | Allen | 434/226 |
| 8,197,257 | B2 * | 6/2012 | Clewis | 434/226 |
| 8,408,917 | B2 * | 4/2013 | Perrone | 434/226 |
| 2005/0050816 | A1 * | 3/2005 | Manning et al. | 52/213 |
| 2009/0215014 | A1 * | 8/2009 | Walker | 434/226 |
| 2010/0109294 | A1 * | 5/2010 | Klementowicz et al. | 280/656 |
| 2010/0304344 | A1 * | 12/2010 | Walker | 434/226 |
| 2010/0311015 | A1 * | 12/2010 | Sovine et al. | 434/11 |
| 2011/0025076 | A1 * | 2/2011 | Shelley | 292/216 |
| 2012/0156663 | A1 * | 6/2012 | Troxell | 434/219 |

* cited by examiner

*Primary Examiner* — Katherine Mitchell
*Assistant Examiner* — Justin Rephann

(57) ABSTRACT

An explosive breach training system comprising a frame having a lock jamb with two opposing ends and an inner surface, two wide members connected to the opposing ends of the lock jamb, and a long member having ends connected to the wide members. The frame defines an interior space. A hinge jamb assembly comprises an elongate member within the interior space, the assembly being slidably attached to the frame and moveable between the lock jamb and the long member. A door member has a hinge side attachable to the assembly and a lock side, and fits in a door space defined by the elongate member, the lock jamb, and the portions of the wide members extending between the assembly and the opposing ends of the lock jamb. A lock bracket is adjacent to the lock jamb, and defines an elongate slot intersecting with a portion of said door space.

10 Claims, 4 Drawing Sheets

US 8,720,117 B2

EXPLOSIVE BREACH TRAINING SYSTEM

CROSS REFERENCE TO RELATED APPLICATIONS

This original application claims the benefit of U.S. provisional application Ser. No. 61/452,824, filed Mar. 15, 2011 and entitled Explosive Breach Training System, which is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to training devices for public-safety and military personnel. More specifically, the present invention is a door breach training system that allows such personnel to quickly and efficiently train for forced-entry scenarios requiring explosive breaching.

2. Description of the Invention

Both public-safety and military personnel are often faced with the need to perform a forced entry into structures. A forced entry can be, and often is, a life-threatening scenario during which every second counts. Shaving seconds from the operation can mean the difference between life-saving tactical surprise and life-ending ambush. Knowledge of and training with the variations in door-breaching techniques, however slight, as well as practice and conditioning for the door breaching operation, are vital to a tactical situation.

SUMMARY OF THE INVENTION

The present invention is an explosive breach training system comprising a frame having a lock jamb with two opposing ends and an inner surface, two wide members connected to said opposing ends of said lock jamb, and a long member having ends connected to said wide members opposite of said lock jamb. The frame defines an interior space. A hinge jamb assembly comprises an elongate member within the interior space, with the hinge jamb assembly being slidably attached to the frame and selectively moveable between said lock jamb and said long member. A door member has a hinge side attachable to said hinge jamb assembly and a lock side, and is sized to fit in a door space defined by the elongate member, the lock jamb, and the portions of the wide members extending between the hinge jamb assembly and the opposing ends of the lock jamb. A lock bracket is adjacent to the lock jamb, and defines an elongate slot intersecting with a portion of said door space.

The system provides for the quick change-out of breached doors that dramatically reduces down time and is cost effective compared to using actual doors and frames or jury-rigged systems. The embodiment promotes realism in training, and is designed to allow explosive breaching personnel to be incorporated into the system during training. This allows an assault team to practice with the explosive personnel team during placement and subsequent percussion of charges.

DETAILED DESCRIPTION OF THE INVENTION

Figure 1:
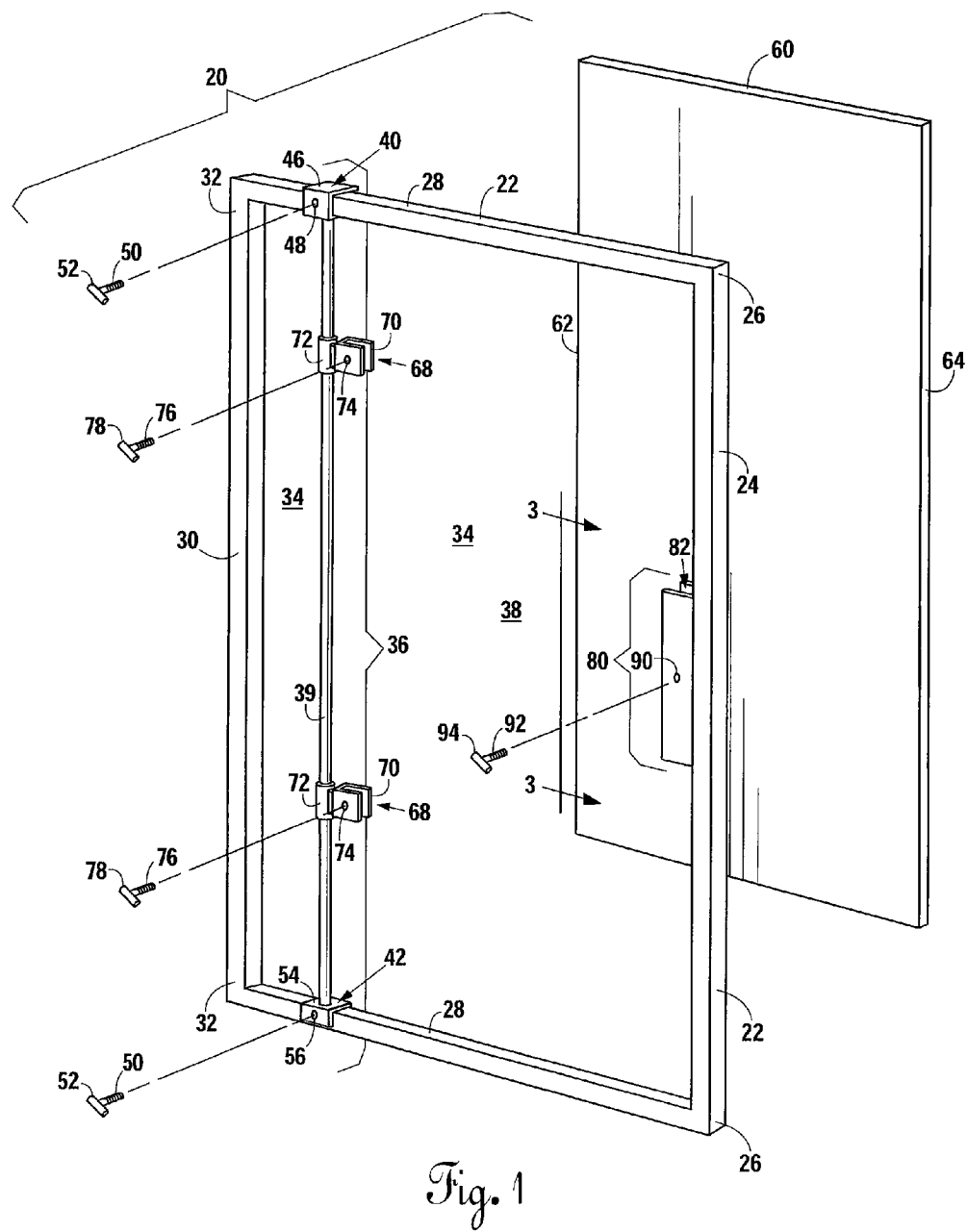
FIG. 1 shows an assembled view of the preferred embodiment of the present invention.
Figure 2:
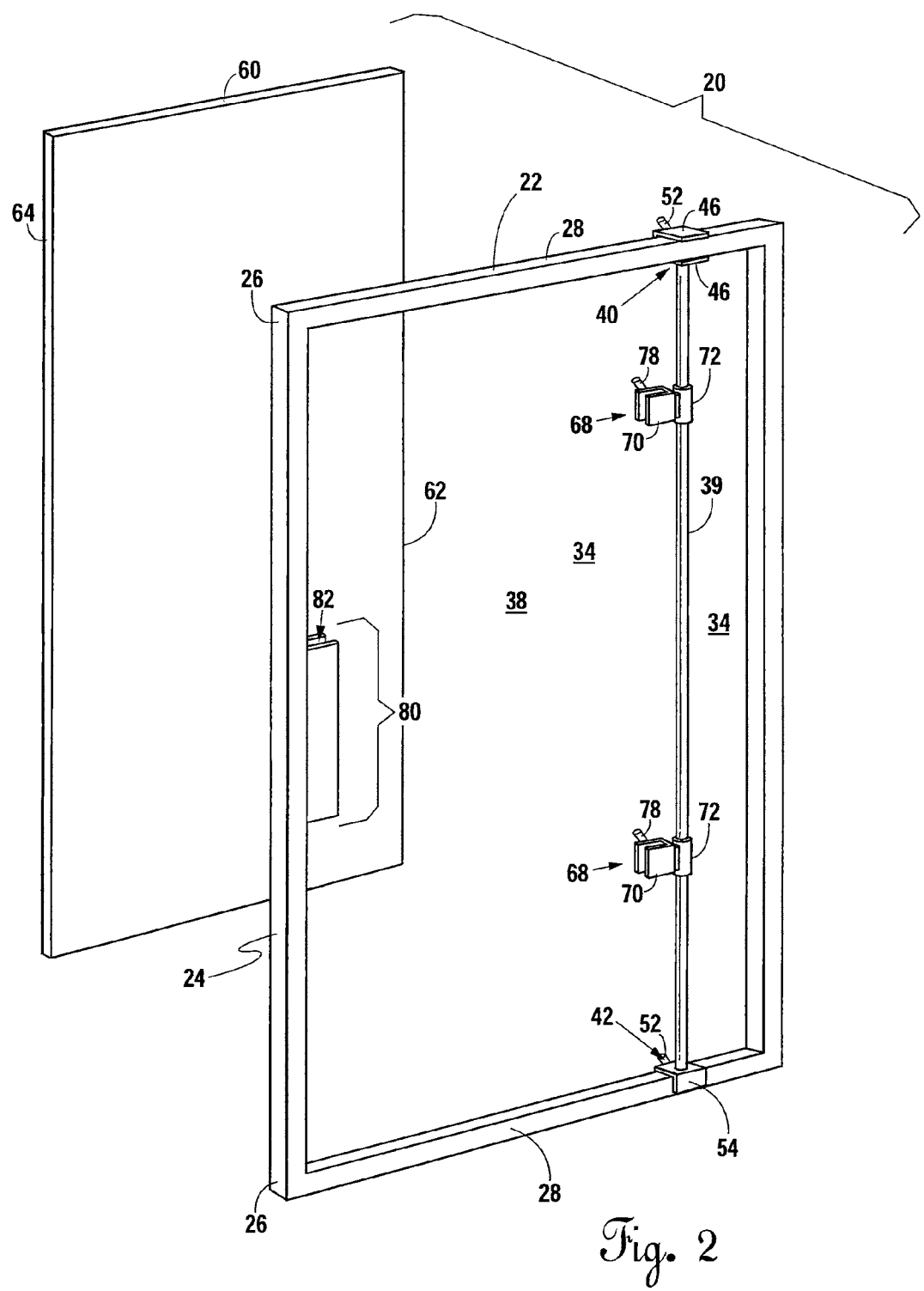
FIGS. 2-3 depict the frame and hinge bar of the preferred embodiment with greater detail.

FIGS. 1-2 are front and rear isometric views, respectively, of an embodiment 20 of the invention. As used herein, "front" means the side of the invention from which a simulated breach is conducted, and is synonymous with the outside of a door to a structure into which breach is desired.

The embodiment 20 comprises a durable, reusable frame 22 formed of square tubing and having a lock jamb 24 with opposing ends 26, upper and lower wide members 28 connected at right angles to the opposing ends 26 of the lock jamb 24, and a long member 30 having opposing ends 32 connected to the wide members 28 at right angles. The frame 22 defines a rectangular interior space 34, and may be free-standing or mounted to an existing structure.

A hinge jamb assembly 36 is slidably attached to the wide members 28 at attachment points and selectively moveable within the interior space 34 between the lock jamb 24 and the long member 30 to define a door space 38 that intersects with the interior space 34 defined by the frame 22. At any time, the width of the door space 38 depends on where the hinge jamb assembly 36 is positioned within the interior space 34.

The hinge jamb assembly 36 comprises a cylindrical, elongate member 39 rotatably attached to upper and lower frame clamp assemblies 40, 42, which provides the slidable attachment to the wide members 28. The upper frame clamp assembly 40 includes a U-shaped clamp body 46 that partially surrounds a section of the upper wide member 28, with the opened end of the clamp body 46 orientated rearward. The upper clamp assembly 40 also includes a threaded rod 50 with an attached handle 52. The clamp body 46 has a threaded hole 48 through the front side that is aligned with the upper wide member 28 for engagement with the threaded rod 50. The lower frame clamp assembly 42 includes a U-shaped clamp body 54 that partially encircles a section of the lower wide member 28. The U-shaped clamp body 54 has threaded hole 56 therethrough aligned with the lower wide member 28 for engagement with a threaded rod 50. The open end of the clamp body 54 is orientated downward. The frame clamp assemblies 40, 42 are each frame clamp means for selectively fixing the elongate member 39 to said frame 22.

A door member 60 has a hinge side 62 attachable to the hinge jamb assembly 36 and a lock side 64. The door member 60 is sized to fit in the door space 38. The door member 60 is attachable to the hinge jamb assembly 36 with two identical door clamp assemblies 68, each having a U-shaped clamp body 70 connected to a pipe segment 72 that encircles the elongate member 39 and a threaded rod 76 attached to a handle 78. The clamp bodies 70 have a threaded hole 74 disposed through the front side for receiving the threaded rod 76. The pipe segment 72 has an interior diameter sized to fit the outer diameter of the elongate member 39. The pipe segment 72 may be welded to the elongate member 39 or attached using other conventional fastening method. The door clamp assemblies 68 are each door clamp means for selectively fixing said elongate member 39 to said hinge side 62 of said door member 60.

Figure 3:
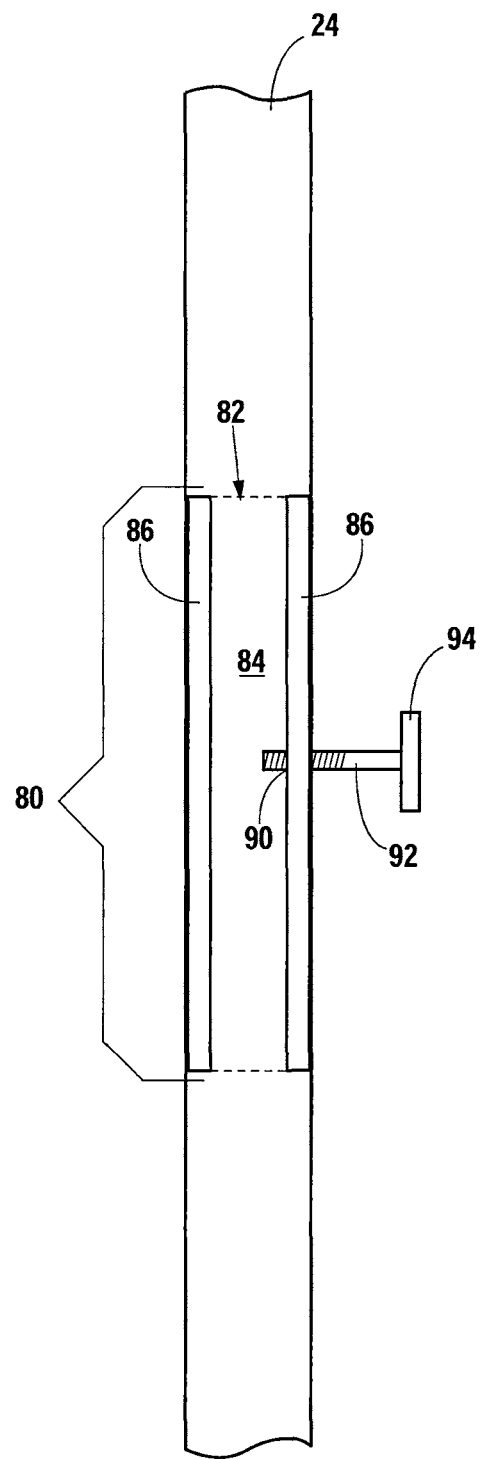

A lock bracket 80 is positioned adjacent to the lock jamb 24. As shown in FIG. 3, the lock bracket 80 defines an elongate slot 82 intersecting with at least a portion of the door space 38, with a portion of the slot 82 being defined by the interior surface 84 of the lock jamb 24. The sides of the lock bracket 80 are formed from identically-sized front and rear steel plates 86 that extend into the door space 38. The front plate 86 has a threaded hole 90 that can receive a threaded rod 92, which is attached to a handle 94.

Use of the embodiment is described initially with reference to FIG. 1-2. Initially, the user selects a door member suitable for the desired type of training. The selected door member may be, without limitation, a hollow core wood door, a solid core wood door, or a metal door, and the invention contemplates the use of various sizes of door members provided that the door fits within the interior space 34 defined by the frame 22. The selected door member is positioned within the interior space 34 and the lock side 64 of the door member 69 is positioned in the slot 82 defined by the lock bracket 80, after which the threaded rod 92 is engaged with the door member 60 through the threaded hole 90. The hinge side 62 of the door member is positioned in the U-shaped clamp bodies 70 of door clamp assemblies 68, and threaded rods 76 are inserted through the threaded holes 74 and tightened to engage the door member 60. While the door members are described as having a lock side and a hinge side, suitable door members may have identical sides such that either of the long sides of the door member 60 may function as a lock side and either side may function as a hinge side.

The position of the door member 60 within the interior space 34 may be adjusted by loosening the upper and lower frame clamp assemblies 40, 42 from the wide members 28, sliding the hinge jamb assembly 36 laterally to a new position within the interior space 34, and then reengaging the frame clamp assemblies 40, 42 with the wide members 28 to secure the hinge clamp assembly 36 in place. The position of the hinge jamb assembly 36 should be such that the lock side 64 of the door member 60 is positioned within the slot 82 and is engagable by the threaded rod 92 through the corresponding threaded hole 90.

Figure 4:
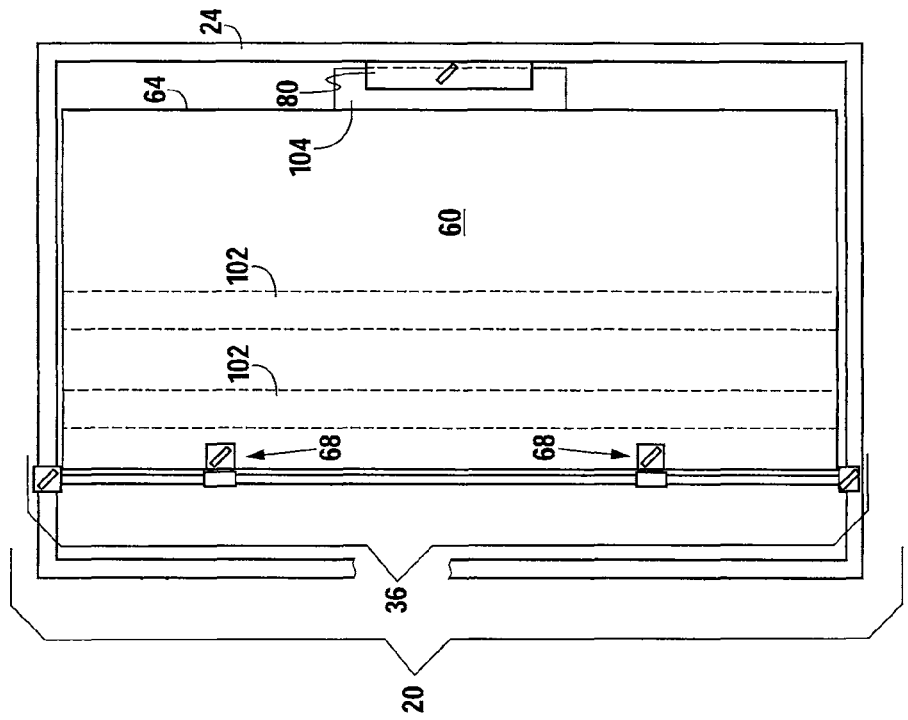
FIG. 4 provides additional detail concerning the clamp assemblies of the preferred embodiment.

FIG. 4 shows one possible area 100 on the front surface of the door member 60 for placement charges (e.g., pushing or cutting charges) in order to breach the invention proximal to the lock jamb 24 and lock bracket 80. The charges should not come into direct contact with the frame 22 or any of the components engaging the door member 60.

After detonation of the charges, the door member 60 will fracture and be rotatable with the hinge assembly 36. The breached door member 60 may then be quickly replaced by loosening the door clamp assemblies 68, removing the damaged door member 60, and inserting a new door member for the next training sequence.

Figure 5:
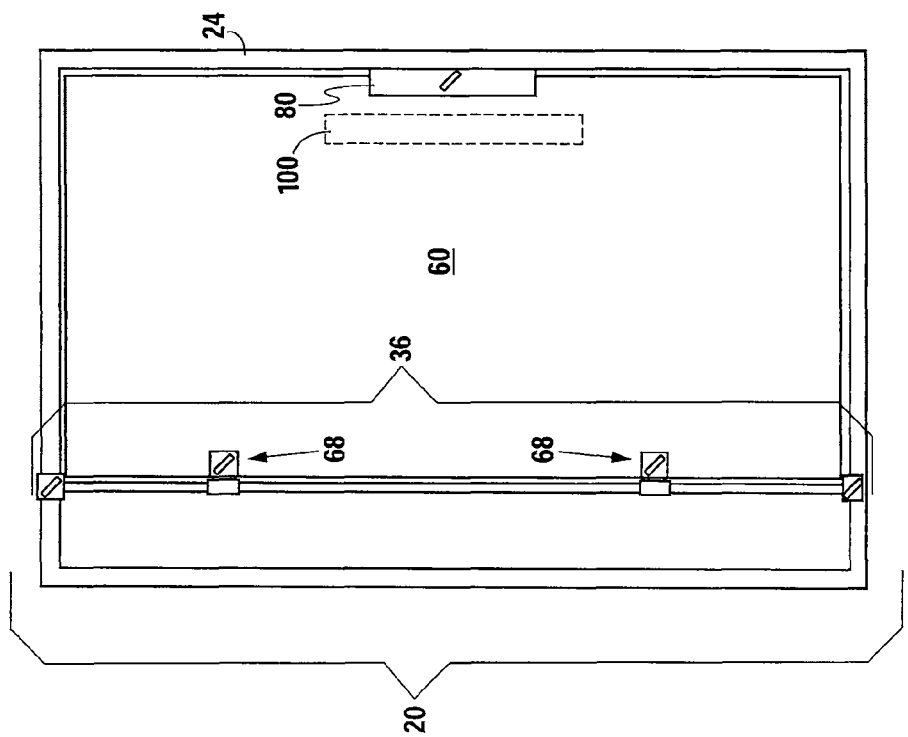
FIG. 5 shows positions for placement of explosive charges when using the system.

FIG. 5 shows alternative areas 102 on the front surface of the door member 60 for placement of charges. This configuration incorporates a spacing member 104 clamped into the lock bracket 80 to allow the lock side 64 of the door member 60 to fall free after the charges are triggered. Prior to detonation, the door member 60 is held in the door space by the door clamp assemblies 68 and frictional engagement of the lock side 64 of the door member 60 with the spacing member 104. After detonation, the spacing member 104 allows the door member 60 to fall freely from the frame when the hinge side of the door member is breached. In this embodiment, the spacing member 104 is wood.

The present invention is described in terms of a preferred illustrative embodiment of a specifically described system. Those skilled in the art will recognize that alternative constructions of such a system can be used in carrying out the present invention. Other aspects, features, and advantages of the present invention may be obtained from a study of this disclosure and the drawings, along with the appended claims.

I claim:

1. An explosive breach training system comprising:
   a frame having a lock jamb with two opposing ends and an inner surface, first and second opposing frame members connected to said opposing ends of said lock jamb, and a third frame long member having ends connected to said first and second frame members opposite of said lock jamb, said frame defining an interior space;
   a cylindrical elongate member within the interior space, said cylindrical elongate member attached to said first frame member at a first attachment point and attached to said second frame member at a second attachment point;
   a door member having a hinge side and a lock side, said hinge side attached to said elongate member, said door member at least partially within a door space defined by said elongate member, said lock jamb, and portions of said first and second frame members extending between said attachment points and said opposing ends of said lock jamb;
   a lock bracket adjacent to said lock jamb, said lock bracket defining an elongate slot intersecting with a portion of said door space;
   a first frame clamp assembly having a first cylindrical bearing surface adjacent a first end of said elongate member and attached to said first frame member;
   a second frame clamp assembly having a second cylindrical bearing surface adjacent a second end of said elongate member and attached to said second frame member; and
   at least one door clamp assembly attached to said elongate member and to said hinge side of said door member.

2. The explosive breach training system of claim 1 wherein said first frame clamp assembly comprises:
   a clamp body at least partially surrounding a section of said frame; and
   an engagement member threadedly engageable with said clamp body, said engagement member being selectively engageable with said frame.

3. The explosive breach training system of claim 2 wherein said clamp body comprises a U-shaped bracket having a hole therethrough; and wherein said engagement member comprises a threaded rod disposed through the hole and having a handle attached to an end thereof.

4. The explosive breach training system of claim 1 wherein said at least one door clamp assembly comprises:
   a clamp body at least partially surrounding a section of said hinge side of said door member; and
   an engagement member connected to said clamp body and selectively engageable with said door member.

5. The explosive breach training system of claim 1 wherein said lock bracket comprises:
   a portion of the inner surface of said lock jamb;
   two elongate planar members attached to said lock jamb defining the elongate slot within said door space; and
   an engagement member threadedly engageable with one of said elongate planar members and selectively engageable with said door member.

6. The explosive breach training system of claim 1 further comprising a spacing member adjacent to and frictionally engaged with said lock side of said door member and at least partially positioned within said elongate slot.

7. The explosive breach training system of claim 1 wherein said hinge jamb assembly comprises at least one frame clamp means for selectively fixing said elongate member to said frame, said frame clamp means rotatably connected to said elongate member.

8. The explosive breach training system of claim 1 wherein said hinge jamb assembly comprises at least one door clamp means for selectively fixing said elongate member to said hinge side of said door member, said door clamp means attached between said elongate member and said door member.

9. The explosive breach training system of claim 1 wherein said lock side of said door member occupies said elongate slot.

10. The explosive breach training system of claim 1 wherein the surfaces defining the interior space consist of frame surfaces.

* * * * *